United States Patent Office 2,743,592
Patented May 1, 1956

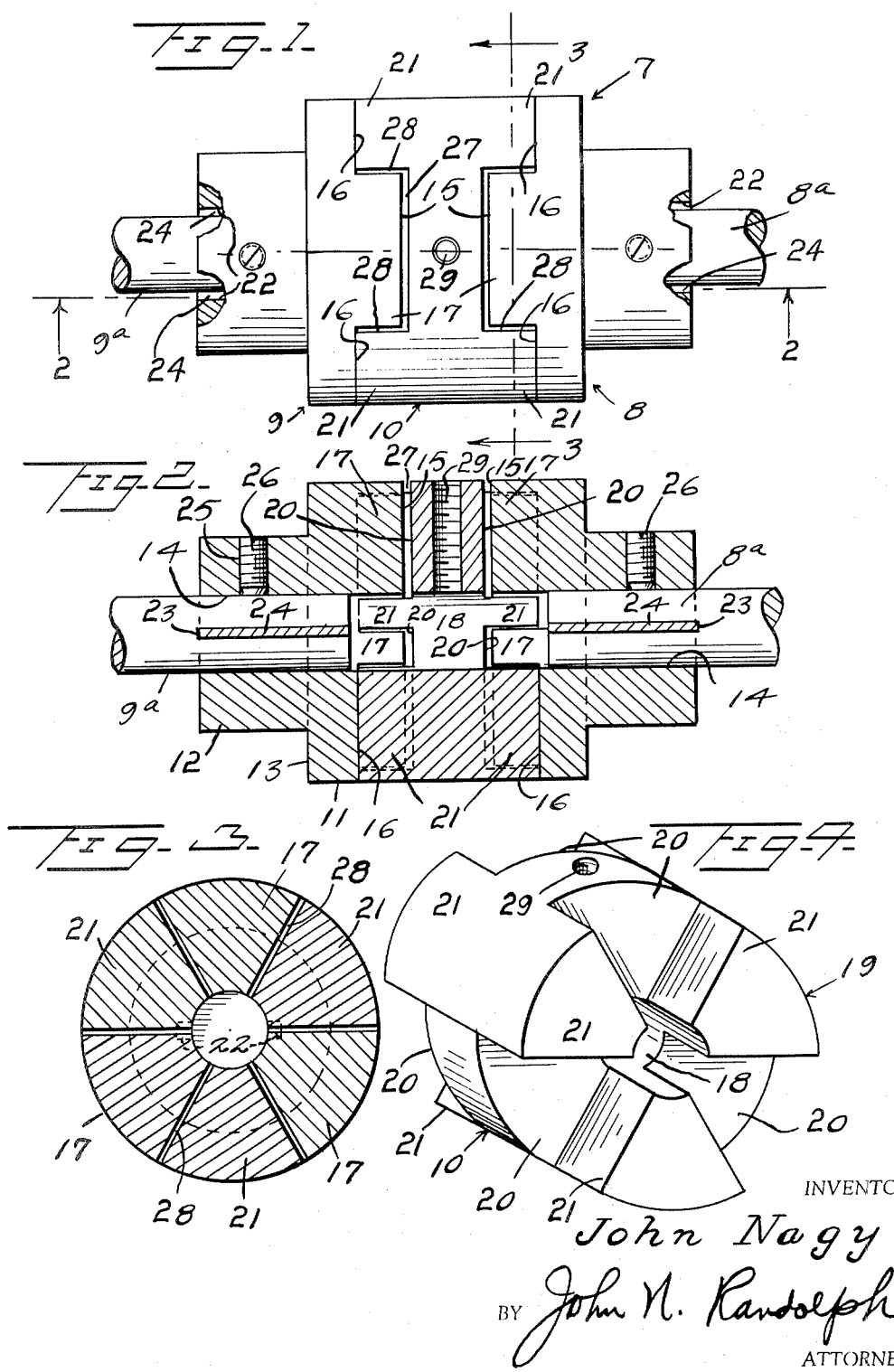

2,743,592

FLEXIBLE SHAFT COUPLING

John Nagy, Trenton, N. J., assignor of one-half to Rose Herbacsek, Trenton, N. J.

Application May 24, 1954, Serial No. 431,822

2 Claims. (Cl. 64—9)

This invention relates to a universally flexible coupling for connecting adjacently disposed shaft ends and by means of which a limited movement of the shafts relatively to one another will be accommodated by the flexible coupling.

More particularly, it is an aim of the present invention to provide a flexible shaft coupling formed of rigid sections comprising shaft engaging end sections and an intermediate section interlocked between said end sections and forming a driving connection between the end sections and permitting a limited movement of either end section relatively to said intermediate section, whereby said end sections are capable of moving relatively to one another while maintained in coupled relationship by the intermediate section.

Various other objects and advantages of the invention will hereinafter become more fully apparent from the following description of the drawing, illustrating a presently preferred embodiment thereof, and wherein:

Figure 1 is an elevation or plan view, partly broken away, of the assembled coupling and showing adjacent ends of two shafts coupled thereby;

Figure 2 is a longitudinal sectional view of the coupling taken substantially along a plane as indicated by the line 2—2 of Figure 1;

Figure 3 is a cross sectional view thereof taken substantially along a plane as indicated by the line 3—3 of Figure 1, and Figure 4 is a perspective view of the intermediate coupling section, shown removed from the coupling.

Referring more specifically to the drawing, the flexible coupling in its entirety and comprising the invention is designated generally 7. The coupling 7 comprises corresponding end sections 8 and 9 and an intermediate section, designated generally 10. The sections 8, 9 and 10 are preferably formed of metal and are each of a one piece rigid construction.

Each end section 8 and 9 includes a head portion 11 and a hub portion 12 which projects from an outer side 13 of the head 11. The head 11 and hub 12 are preferably of circular cross section and the hub 12 is substantially smaller in diameter than the head 11. Each end section has a bore 14 extending therethrough, axially through the head 11 and hub 12 thereof. The inner face 15 of each end section is provided with three radially extending segment shaped grooves or recesses 16 of uniform size and which are equally spaced from one another and each of which extends from the bore 14 to the periphery of the head 11. Said segment shaped grooves 16 combine to form three segment shaped lugs 17, constituting parts of the inner face 15 of said end sections and which are interposed between said grooves or recesses 16. The lugs 17 likewise extend from the bore 14 to the periphery of the head of the end section of which the lugs form a part. Said lugs 17 are of a width circumferentially of the head slightly less than the circumferential width of the grooves 16.

The intermediate coupling section 10 comprises a relatively thick disk of the same diameter as the head 11 and which is provided with a central bore 18 which registers with the bores 14. The disk forming the intermediate section 10 has corresponding end faces, each designated generally 19, each of which is provided with three grooves or recesses 20 which are segment shaped and which extend from the bore 18 to the periphery of the section 10 and which are equally spaced from one another. Said grooves or recesses 20 form three segment shaped circumferentially spaced lugs 21 constituting a part of each end face 19 of the section 10. The lugs 21 are preferably of the same circumferential width as the lugs 17 and the grooves or recesses 20 are likewise preferably of the same circumferential width as the grooves or recesses 16. Accordingly, the grooves or recesses 20 are slightly wider circumferentially than the lugs 21. However, as clearly illustrated in Figures 1 and 2, the grooves or recesses 20 are preferably deeper than the grooves 16 and accordingly the lugs 21 are of greater thickness than the lugs 17 or of a thickness greater than the depth of the recesses 16. As illustrated in the drawing, the lugs 21 and recesses 20 of the two end faces 19 of the intermediate section 10 are disposed in alignment.

The bores 14 of the end coupling sections 8 and 9 are adapted to receive adjacent ends 8a and 9a of two shafts to be coupled by the coupling 7, either of which shafts may be the driven shaft and either of which may be the driving shaft. Each bore 14 is preferably provided with two longitudinally extending keyways 22 to register with keyways 23 of the shaft ends, in which communicating keyways 22 and 23, keys 24 engage. Each hub 12 is also preferably provided with a threaded bore 25 extending radially from its periphery into the bore 14 for receiving a setscrew 26 by means of which the shaft end disposed in said bore is secured to the coupling end section of which said hub forms a part. The terminals of the inner ends of the shaft ends 8a and 9a preferably terminate in the heads 11 between the beds of the grooves or recesses 16 and the hubs 12 thereof, as illustrated in Figure 2.

One of the end coupling sections may be assembled on one of the shaft ends and the other end coupling section and intermediate coupling section may then be assembled with one another and with the first mentioned end section, after which the other shaft end may be inserted in and secured to the other end section. By lengthening the keyways 23 of the shaft ends 8a and 9a, or by omitting the keys 24 and securing the end section to the shaft ends solely by the setscrews 26, the end sections 8 and 9 may be first applied to the shaft ends 8a and 9a and displaced inwardly thereof so that the intermediate section 10 can be inserted therebetween, after which the end sections can be displaced toward one another into interfitting engagement with the intermediate section 10 and thereafter secured by the fastenings 26 to said shaft ends.

With the coupling 7 completely assembled and secured to the shaft ends, as illustrated in Figures 1 and 2, the lugs 21 will engage the beds of the grooves or recesses 16. However, the lugs 17 will be spaced slightly from the beds of the grooves 20 to provided the circumferentially extending clearance spaces 27, as seen in Figures 1 and 2. Likewise, the radial side walls of the lugs 17 and 21 will be normally spaced apart slightly to provide the clearance spaces 28, which are disposed longitudinally of the coupling 7, as seen in Figures 1 and 3. The spaces 28 need only be of sufficient width to permit the lugs 17 and 21 to move relatively to one another in directions parallel to the longitudinal axis of the coupling 7.

The intermediate section 10 is provided with a threaded bore 29 in an intermediate part thereof, which extends from its bore 18 to its periphery and which is adapted to receive a suitable lubricating fitting, by means of which the coupling 7 may be lubricated.

It will be readily apparent that the interfitting or intermeshed lugs 17 and 21 will cause the three sections of the coupling 7, when assembled as illustrated in Figures 1, 2 and 3, to rotate as a unit for causing unitary rotation of the shaft ends 8a and 9a. The intermediate coupling section and the end coupling sections provide for lost motion between the shafts 8a and 9a and permit either shaft and the end coupling section fixed thereto to move to a limited extent laterally of the coupling, so that the shafts can rotate in parallel misalignment i. e., with the shafts disposed parallel to one another but not in alignment.

Various modifications and changes are contemplated and may obviously be resorted to, without departing from the spirit or scope of the invention as hereinafter defined by the appended claims.

I claim as my invention:

1. A flexible shaft coupling of the character described comprising a pair of corresponding end coupling sections and an intermediate coupling section, said coupling being adapted to be disposed between adjacent ends of shafts to be coupled, means provided in said end coupling sections for securing the adjacent shaft ends thereto, said end coupling sections having adjacently disposed faces provided with corresponding lugs, said lugs being segment shaped, the lugs of each end section being circumferentially spaced relatively to one another, said intermediate coupling section having end faces each provided with a number of circumferentially spaced segment shaped lugs corresponding to the number of lugs of each end coupling section, said intermediate coupling section being interposed between the end coupling sections and the lugs of the intermediate coupling section interfitting between the lugs of the end coupling sections whereby said coupling sections will be caused to rotate as a unit, said coupling sections each being circular in cross section, and the lugs of said intermediate coupling section being thicker in a direction longitudinally of the coupling than the lugs of the end coupling sections, whereby outer faces of the lugs of the end coupling sections are spaced from adjacent faces of the intermediate coupling section to provide longitudinally and circumferentially spaced gaps between portions of the end coupling sections and said intermediate coupling section, said lugs of the intermediate and end coupling sections being of a circumferential width less than the spacing between said lugs to provide clearance gaps between the radial side walls of the interfitting lugs to permit a limited lost motion or radial movement of either end coupling section relative to the intermediate coupling section.

2. An elongated coupling of circular cross section comprising corresponding end coupling sections and an intermediate coupling section, means for securing said end coupling sections to adjacent ends of two shafts to be rotatably coupled, said intermediate coupling section having corresponding ends each provided with three circumferentially spaced segment shaped lugs, said end coupling sections having adjacent ends each provided with three circumferentially spaced segment shaped lugs arranged whereby the lugs of said intermediate section interfits between the lugs of both end sections when the coupling sections are assembled for coupling said sections for unitary rotation and to permit a limited lost motion or radial movement of either end section of the coupling relative to the intermediate section or of said intermediate section relative to either end section to provide a universally flexible coupling, said lugs of the intermediate coupling section being of a greater thickness longitudinally of the coupling than the lugs of the end coupling sections to provide clearance gaps between the intermediate coupling section and said end coupling sections, said clearance gaps extending circumferentially of the coupling and constituting longitudinally and circumferentially spaced individual gaps, said lugs of the intermediate and end coupling sections being of a circumferential width less than the spacing between said lugs to provide clearance gaps between the radial side walls of the interfitting lugs, said lugs of the intermediate and end coupling sections being of uniform circumferential width longitudinally of the coupling.

References Cited in the file of this patent

UNITED STATES PATENTS

| | | |
|---|---|---|
| 1,407,445 | Spangler | Feb. 21, 1922 |
| 2,551,735 | Goff | May 8, 1951 |